Nov. 14, 1961   C. H. VLACHOS   3,008,419
COMBINED MOTOR AND PUMP
Filed Nov. 13, 1958   4 Sheets-Sheet 1

INVENTOR
Constantinos H. Vlachos
BY Ogle R. Singleton
ATTORNEY

Nov. 14, 1961    C. H. VLACHOS    3,008,419
COMBINED MOTOR AND PUMP
Filed Nov. 13, 1958    4 Sheets-Sheet 2
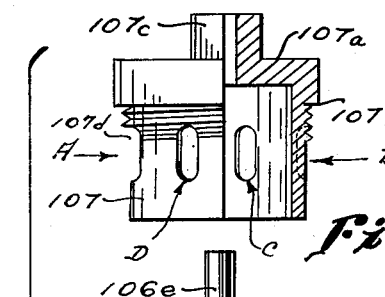
Fig. 9.
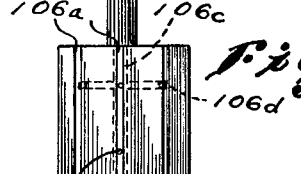
Fig. 7.
Fig. 10.
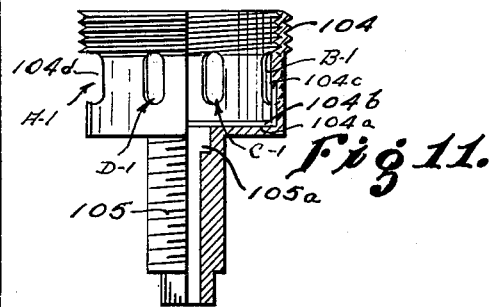
Fig. 11.
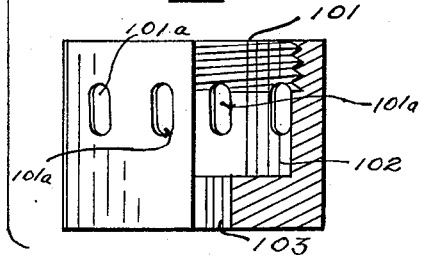
Fig. 12.
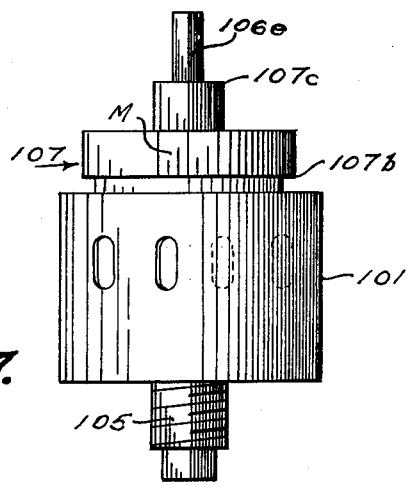
Fig. 8.
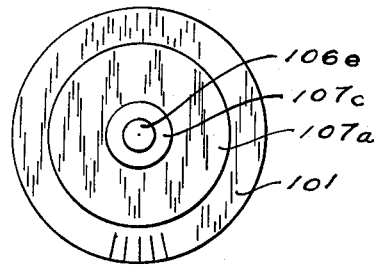
Fig. 13.
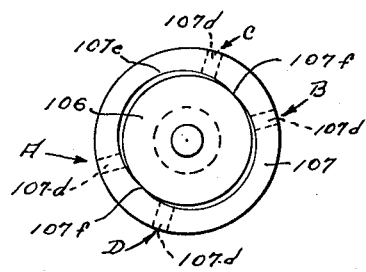
INVENTOR
Constantinos H. Vlachos
BY Ogle R. Singleton
ATTORNEY

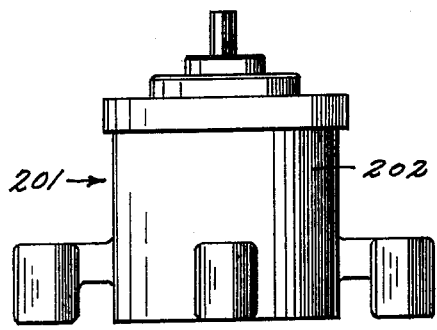
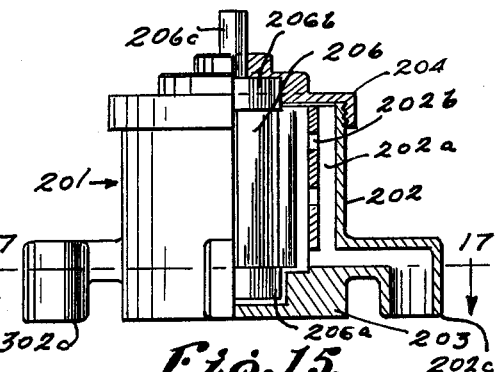
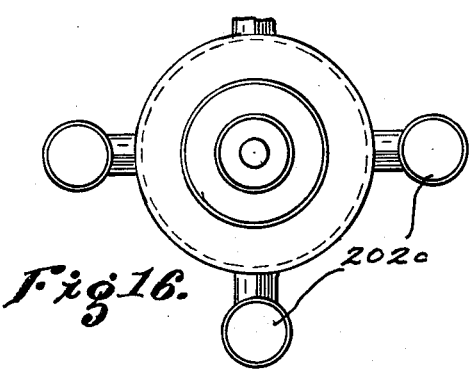
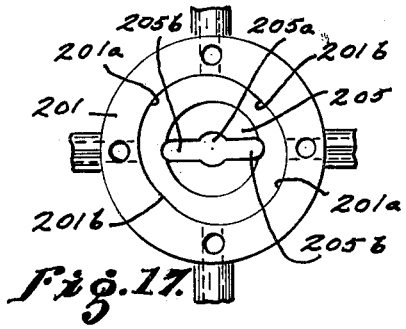

Nov. 14, 1961 — C. H. VLACHOS — 3,008,419
COMBINED MOTOR AND PUMP
Filed Nov. 13, 1958 — 4 Sheets-Sheet 4
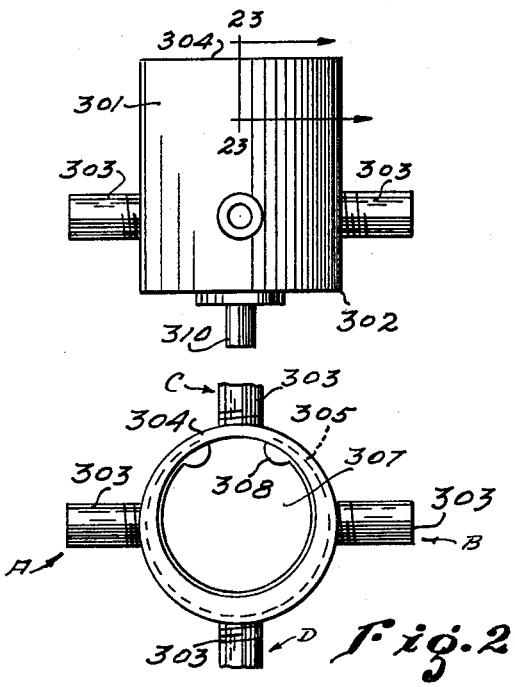
Fig. 22.
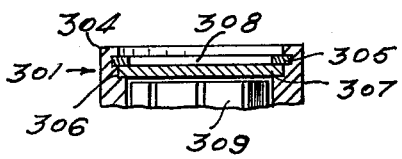
Fig. 23.
Fig. 25.
Fig. 24.
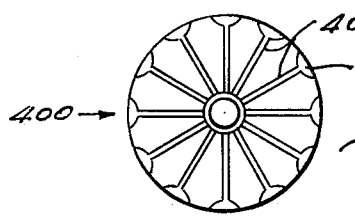
Fig. 26.
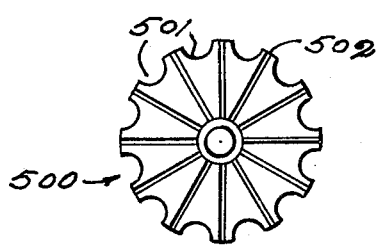
Fig. 27.
Fig. 28.
INVENTOR
Constantinos H. Vlachos
BY Ogle R. Singleton
ATTORNEY

United States Patent Office 3,008,419
Patented Nov. 14, 1961

3,008,419
COMBINED MOTOR AND PUMP
Constantinos H. Vlachos, 1930 K St. NW.,
Washington, D.C.
Filed Nov. 13, 1958, Ser. No. 773,787
2 Claims. (Cl. 103—3)

My invention consists in a new and useful improvement in combined motor and pump and is designed to produce a device for actuating a driving shaft when energized by fluid under pressure, and for pumping fluid when energized by a prime mover. The particularly novel and useful feature of my device is its control mechanism whereby (1) the direction of rotation of the driving shaft is reversed, and (2) the direction of flow of the pumped fluid is reversed.

The essential elements of my device are a novel form of rotor serving alternatively as a turbine and a rotary pump, and a valve for controlling the direction of flow of the fluid to the rotor functioning as a turbine, and from the rotor functioning as a pump.

While I illustrate in the drawings and hereinafter fully describe several embodiments of my invention, it is to be distinctly understood that I do not consider my invention to be limited to said embodiments, but refer for its scope to the claims appended hereto.

In the drawings:

FIG. 7 is a side elevation of a second form of my device.

FIG. 8 is a top plan of the device of FIG. 7.

FIGS. 9, 10, 11 and 12 are exploded views of FIG. 7, partly in section.

FIG. 13 is a bottom plan of FIG. 9.

FIG. 14 is a side elevation of a third form of my device.

FIG. 15 is a view similar to FIG. 14 in partial vertical section.

FIG. 16 is a top plan of the device of FIG. 14 partly broken away.

FIG. 17 is a horizontal section on the line 17—17, in the direction of the arrows.

FIG. 18 is a side elevation of the rotor of the device of FIG. 14, without the vanes.

FIG. 19 is a bottom plan of the rotor of FIG. 18.

FIG. 20 is a side elevation, partly in section, of the rotor of FIG. 18.

FIG. 21 is a perspective of one of the vanes.

FIG. 21-a is a perspective of a modified form of vane.

FIG. 22 is a side elevation of a fourth form of my device.

FIG. 23 is a fragmentary vertical section on the line 23—23 of FIG. 22, in the direction of the arrows.

FIG. 24 is a top plan of the device of FIG. 22.

FIG. 25 is a detail showing the locking ring of the device of FIG. 22.

FIG. 26 is a bottom plan of a modified form of rotor.

FIG. 27 is a bottom plan of another modified form of rotor.

FIG. 28 is a vertical section of a plurality of casings for a plurality of rotors for a single shaft.

Figure 1:
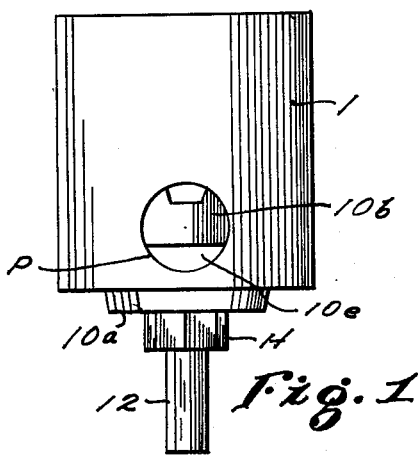
FIG. 1 is a side elevation of one form of my device.

One form of my device is shown in FIGS. 1 to 6. This form has a hollow casing 1 with circular orifices 2 and 3 in its bottom and top respectively, a peripheral groove 4 at its bottom end, a pair of diametrical vertical grooves 5 and 6 rising from the groove 4, a peripheral groove 7 at its top end, and a pair of diametrical grooves 8 and 9 depending from the groove 7. The casing 1 has an inlet port P communicating with the groove 4 (FIG. 1.)

Figure 2:
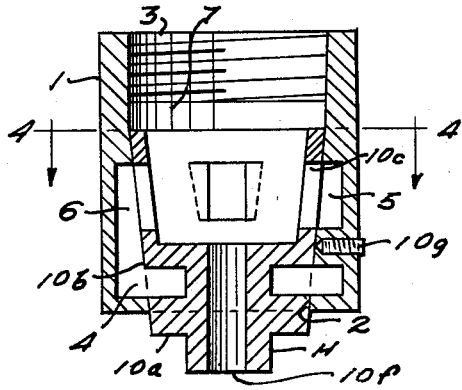
FIG. 2 is a vertical section on the line 2—2 of FIG. 3, in the direction of the arrows.
Figure 3:
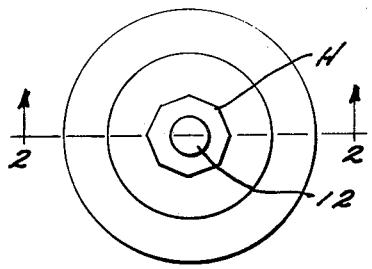
FIG. 3 is a bottom plan of the device of FIG. 1.
Figure 4:
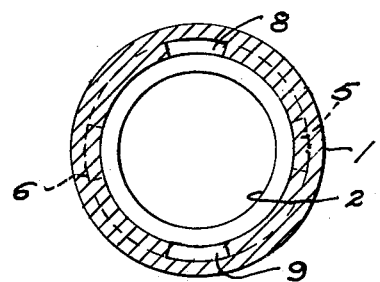
FIG. 4 is a horizontal section on the line 4—4 of FIG. 2, in the direction of the arrows, the valve member and rotor being omitted.
Figure 5:
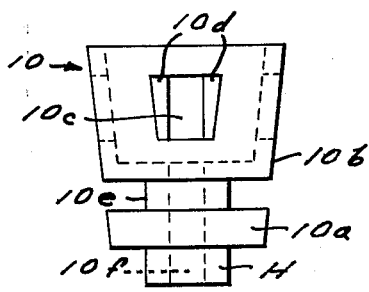
FIG. 5 is a side elevation of the valve member of the device of FIG. 1.

A hollow conical valve member 10 is seated in the casing 1, its collar 10–a fitting in the orifice 2, and its skirt 10–b disposed between the peripheral grooves 4 and 7. The skirt 10–b has four symmetrically disposed ports 10–c, so disposed as to communicate with grooves 5, 6, 8 and 9. It will be noted (FIG. 5) that the sides 10–d of the ports 10–c flare outwardly. The stem 10–e of the member 10 has an axial passage 10–f and projects below the bottom end of the casing 1 (FIG. 2). The collar 10–a has a hex-head H disposed outside the casing 1. A lock bolt 10–g (FIG. 2) is suitably threaded through the casing 1 and is adapted to bear on the skirt 10–b of the member 10 to lock the member 10 in adjusted positions.

A cylindrical rotor 11 (FIG. 6) is disposed in the skirt 10–b of the member 10 and has a shaft 12 thereon journaled in the passage 10–f. The rotor 11 has a plurality of radial grooves 11–a in which are slidably mounted vanes V (FIG. 21). The rotor 11 has an axial duct 11–b (FIG. 6) which communicates with the groove 7 and from which extend a plurality of transverse ducts 11–c to the grooves 11–a.

It will be noted (FIG. 6) that the interior of the skirt 10–b of the member 10 is not circular in cross-section, having a pair of arcuate portions 10–h having lesser radii and a pair of arcuate portions 10–i having greater radii. As clearly shown in FIG. 6, the cylindrical rotor 11 has its periphery immediately adjacent the portions 10–i and spaced from the portions 10–h providing concavities between the member 10 and the rotor 11. Also it will be noted that consequent to the interior configuration of the skirt 10–b the vanes V are retracted in their grooves 11–a as they pass the portions 10–i and are projected from the grooves 11–a into said concavities as they pass the portions 10–h, for a purpose presently to be explained.

A second form of my device is shown in FIGS. 7 to 13. In this form, there is a cylindrical casing 101 (FIGS. 7 and 12) providing a cylindrical chamber 102 from which depends a central bore 103. A shell 104 (FIG. 11) is threaded in the chamber 102 and has a depending tube 105 passed through the bore 103 and projecting below the bottom of the casing 101 (FIG. 7). In the bottom 104–a of the shell 104 there is a transverse groove 104–b to form a conduit communicating with an enlargement 105–a in the bore 105. A cylindrical rotor 106 (FIG. 10) has radial grooves 106–a which extend downwardly through a cylindrical boss 106–b on the bottom of the rotor 106. The rotor 106 is disposed in the shell 104, the boss 106–b being co-axial with the enlargement 105–a. The rotor 106 has a central bore 106–c communicating with the conduit 104–b and enlargement 105–a, with transverse bores 106–d opening into the bottom of the grooves 106–a. A vane V (FIG. 21) is disposed in each of the grooves 106–a. A shell 107 (FIG. 9) is threaded in the shell 104 between the shell 104 and the rotor 106. The shell 107 has a top 107–a with a peripheral depending flange 107–b to fit on the upper periphery of the shell 104, and a central bearing 107–c for a shaft 106–e of the rotor 106.

The casing 101 has four ports 101–a disposed about its periphery. The shell 104 has four ports 104–d disposed about its periphery. The shell 107 has four ports disposed about its periphery. The four ports 101–a in the casing 101 and the four ports 104–d in the shell 104 are all discharge ports to evacuate from the device the fluid which is introduced into the device through the tube 105. Of the four ports 107–d of the shell 107, two are inlet ports, designated A and B, and two are discharge ports, designated C and D.

It will be noted (FIG. 11) that the shell 104 has a pair of diametrical, vertical grooves 104–c which connect the ends of the transverse groove 104–b with the two inlet ports 107–d (A and B) thereby providing a conduit for the fluid to pass through conduit ports 104–d in shell 104 and ports 107–d in shell 107 to the rotor 106.

It will be noted (FIG. 13) that the interior of the shell 107 is not circular in cross-section, having two arcuate portions 107–e having shorter radii and two arcuate portions 107–f having longer radii. As shown in FIG. 13, the cylindrical rotor 106 has its periphery immediately adjacent the portions 107–f and spaced from the portions 107–e to provide concavities between the shell 107 and the rotor 106.

Also it will be noted that consequent to the interior configuration of the shell 107 the vanes V are retracted in their grooves 106–a as they pass the portions 107–f of the shell 107 and are projected from their grooves 106–a as they pass the portions 107–e of the shell 107, for a purpose presently to be explained.

Figure 6:
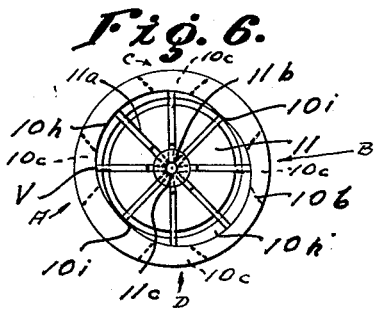
FIG. 6 is a top plan of the valve member and the rotor.

It will be noted (FIGS. 6 and 13) that the concavities formed by the two arcuate portions 107–e disposed between the two arcuate portions 107–f (FIG. 13) are considerably more shallow than the concavities formed by the two arcuate portions 10–h disposed between the two arcuate portions 10–i (FIG. 6). It is to be understood that I have so designed these parts as to determine the speed of rotation of the rotor. Since the degree of the maximum depth of these concavities determines the distance of travel of the vanes into and out of the grooves in the rotor, it is obvious that the less the degree of maximum depth of the concavities and consequently the distance of travel of the vanes, the higher the speed of rotation.

A third form of my device is shown in FIGS. 14 to 17. In this form there is a casing 201 having a cylindrical wall 202, a bottom 203 and a cover 204 threaded on top of the wall 202. There are four conduits 202–a symmetrically disposed in the wall 202. Each conduit 202–a has three inner ports 202–b to the inside of the casing 201 and a pipe 202–c to the outside of the casing 201. The bottom 203 has a central circular recess 205 (FIG. 17) with a central depression 205–a and a pair of radial grooves 205–b in its bottom, communicating with the upper surface of the bottom 203. A cylindrical rotor 206 is journaled in a ball bearing 206–a seated in the recess 205 and a second ball bearing 206–b mounted in the cover 204. The rotor 206 has a shaft 206–c journaled in the cover 204. The rotor 206 has a plurality of vanes V (FIG. 21) slidably mounted in radial grooves V–1 in the rotor 206 (FIGS. 18, 19, 20). It will be noted (FIG. 20) that the slots V–1 have bottoms V–2 which are inclined to coverge toward the bottom of the rotor 206. The rotor 206 has a central bore 206–d (FIG. 18) which passes through the ball bearing 206–a and communicates with the depression 205–a in the recess 205. The conduit 206–d has a plurality of radial bores 206–e opening into the bottom of the radial grooves V–1.

It will be noted (FIG. 17) that the interior of the casing 201 is not circular in cross-section, having two arcuate portions 201–a having shorter radii and two arcuate portions 201–b having longer radii. It will be understood that the cylindrical rotor 206 has its periphery immediately adjacent the portions 201–b of the interior of the casing 201, and spaced from the portions 201–a to provide concavities between the casing 201 and the rotor 206. Consequently the vanes V are retracted in their grooves V–1 as they pass the portions 201–b and are projected from their grooves V–1 as they pass the portions 201–a, for a purpose presently to be explained.

A fourth form of my device is shown in FIGS. 22 to 25. In this form there is a cylindrical casing 301 having a bottom 302 and four radially, symmetrically disposed conduits 303. In the open, top end 304 of the casing 301 there is a peripheral groove 305 and a peripheral seat 306. A cover plate 307 (FIG. 23) is received on said seat 306 and clamped in closed position by a spring ring 308 seated in the groove 305. A cylindrical rotor 309 (FIG. 23) which is substantially the same as the rotor 206 of the third form of my device heretofore described, is journaled in the casing 301 and has a shaft 310 journaled in the bottom 302 of the casing 301 (FIG. 22). The interior configuration of the casing 301 is substantially the same as that of the casing 201 of the third form of my device heretofore described and the conduits 303 are related to the casing 301 in substantially the same manner as the conduits 202–a are related to the casing 201.

In FIG. 26, I have shown a modified form of rotor 400 in which the grooves 401 have concave sockets 402 at their outer ends. This form of rotor receives the vanes 403 illustrated in FIG. 21–a, which have arcuate convex heads 404 which seat in the sockets 402 when the vanes 403 are retracted in the grooves 401.

In FIG. 27, I have shown another modified form of rotor 500 having concave grooves 501 disposed between the grooves 502 for the vanes V in the rotor.

In FIG. 28, I have shown a modification in which a plurality of casings C, each with a rotor, can be utilized for driving a single shaft S by all the rotors, and for driving the rotors by a single shaft S.

Having described the details of structure of the several forms of my device, I will now describe their operation.

The device shown in FIGS. 1 to 6 has a shaft 12 which is driven by fluid under pressure introduced into the device through the port P and evacuated from the device through the orifice 3, when the devices serves as a motor.

The fluid entering through the port P flows through the groove 4, grooves 5 and 6, through two of the ports 10–c of the valve member 10 and into the two spaces formed by portions 10–h between the inner surface of the valve member 10 and the rotor 11 (FIG. 6). The fluid passes through the other two ports 10–c of member 10, grooves 8 and 9, groove 7 and out through orifice 3. Since the duct 11–b of the rotor 11 communicates with the groove 7, the fluid passes through duct 11–b and ducts 11–c and projects vanes V outwardly in the grooves 11–a in the above-mentioned spaces. It is to be understood that the valve member 10 is so adjusted relative the casing 1 that said spaces and two ports 10–c, designated A and B, are disposed relative the inlet grooves 5 and 6 that the fluid passing through grooves 5 and 6 and said ports 10–c, impinging upon the projected vanes V of the rotor 11 in said spaces, causes the rotor 11 to rotate clockwise (FIG. 6).

By backing off the lock-bolt 10–g, the member 10 is released for adjustment. When the member 10 is rotated clockwise 90° (FIG. 6), the said spaces and two ports 10–c, designated C and D, are brought into communication with grooves 5 and 6 and the member 10 is locked in such position by lock-bolt 10–g. When the member 10 is so adjusted, the fluid passing through grooves 5 and 6 and said ports 10–c (C and D) impinging upon the projected vanes V of the rotor 11 in said spaces, causes the rotor 11 to rotate counter-clockwise.

Thus it is obvious that, when my device is used as a motor, the valve member 10 is capable of adjustment so that the shaft 12 can be alternatively rotated clockwise and counter-clockwise, as desired.

When the device is used as a pump, power from any suitable prime mover is applied to shaft 12 to rotate the rotor 11, which causes fluid to be introduced into the device through the port P and evacuated under pressure through the orifice 3. The fluid entering through port P flows through groove 4, grooves 5 and 6, through two of the ports 10–c of the member 10 and into the aforesaid spaces between the inner surface of member 10 and the rotor 11 (FIG. 6). The fluid is forced by projected vanes V of the rotor 1 through the other two ports 10–c, grooves 8 and 9 and groove 7 and out through orifice 3. The above pumping action occurs when the valve member 10 is adjusted, as above described, for driving the shaft 12 clockwise. When the valve member 10 is adjusted, as above described, for driving the shaft 12 counter-clockwise, the direction of flow of the fluid through the device, by action of the rotor acting as a pump, is reversed, the fluid being introduced through the orifice 3 and evacuated through the port P. The same result can be effected, viz. reversal of direction of flow of the fluid, by reversing the direction of rotation of the rotor 11 without requiring re-adjustment of the valve member 10.

Thus it is obvious that when my device is used as a pump, the shaft 12 can cause the rotor 11 to pump the fluid alternatively in two directions, as desired.

The second form of my device, shown in FIGS. 7 to 13, has a shaft 106–e which is driven by fluid under pressure introduced into the device through the tube 105 and evacuated from the device through the ports 101–a, when the device serves as a motor. The fluid entering through the tube 105 and its enlargement 105–a flows through the groove 104–b to two diametrical points on the periphery of the bottom 104–a, upwardly through grooves 104–c to pass through two of the ports 107–d, designated A and B, of the shell 107 and into the two spaces (FIG. 13) formed by portions 107–e between the inner surface of the shell 107 and the rotor 106. The fluid passes through the other two ports 107–d, designated C and D, of the shell 107, through two of the ports 104–d, designated A–1 and B–1, of the shell 104 and two of the ports 101–a of the casing 101, out of the device.

Since the bore 106–c and bores 106–d of the rotor 106 communicate with the grooves 104–b of shell 104, the fluid passes through bores 106–c and 106–d and projects vanes V outwardly in grooves 106–a in the above-mentioned spaces. It is to be understood that, as explained regarding the first form of my device, that the shell 107 is so adjusted relative the shell 104 that said two spaces are so disposed that the fluid under pressure passing through grooves 104–c and ports 107–d (A and B) into said spaces and impinging upon the projected vanes V, causes the rotor 106 to rotate clockwise (FIG. 13) thereby driving the shaft 106–e. The fluid passes out through ports 107–d (C and D) of shell 107, ports 104–d (A–1 and B–1) and ports 101–a of the casing 101. By rotating the shell 107 relative the shell 104, the said spaces are so re-adjusted relative the shell 104 that the fluid passing from the grooves 104–c of the shell 104 through the two ports 107–d (C and D) and into said spaces causes the rotor 106 to rotate counter-clockwise thereby reversing the direction of rotation of the shaft 106–e. The fluid passes out through ports 107–d (A and B) of shell 107, ports 104–d (C–1 and D–1) and ports 101–a of the casing 101.

When this form of my device is used as a pump, power from any suitable prime mover is applied to the shaft 106–e to rotate the rotor 106 which causes fluid to be introduced through the tube 105 and evacuated under pressure through ports 101–a of the casing 101. This action occurs when the parts are adjusted as above described to drive the shaft 106–e clockwise. When the parts are adjusted as above described for driving the shaft 106–e counter-clockwise, the direction of flow of the fluid, caused by rotor 106 as a pump, is reversed, the fluid entering through ports 101–a and evacuated through tube 105. The same result can be accomplished by reversing the direction of rotation of the rotor 106, without requiring re-adjustment of shell 107.

The third form of my device, shown in FIGS. 14 to 17, has a shaft 206–c which is driven by fluid under pressure introduced into the device through two inlet conduits 202–a and evacuated from the device through two outlet conduits 202–a, when the device serves as a motor. The fluid entering through inlet conduits 202–a flows into the two spaces (FIG. 17) formed by the portions 201–a between the inner surface of the wall 202 and the rotor 206. The fluid passes through the two outlet conduits 202–a and out of the device. Since bore 206–d and bores 206–e of the rotor 206 communicate with the depression 205–a, the fluid passes through bores 206–d and 206–e of the rotor 206 and projects vanes V outwardly in grooves V–1 into the abovementioned spaces. It is to be understood that, as above explained regarding the first and second forms of my device, said spaces are so disposed relative the aforesaid inlet conduits 202–a that the fluid under pressure passes into said spaces and impinging upon the projected vanes V causes the rotor 206 to rotate clockwise (FIG. 17) thereby driving the shaft 206–c.

By any suitable valve system (not shown) the flow of fluid under pressure into and out of the device through the conduits 202–a can be reversed, thereby causing the rotor 206 to rotate counterclockwise.

When the device of this third form is used as a pump, power from any suitable prime mover is applied to the shaft 206–c to rotate the rotor 206 which causes fluid to be introduced through the inlet conduits 202–a and evacuated under pressure through the outlet conduits 202–a. If the direction of rotation of the shaft 206–c be reversed, the direction of flow of the fluid will be reversed.

The fourth form of my device, shown in FIGS. 22 to 25, has a shaft 310 which is driven by fluid under pressure introduced into the device through two of the conduits 303, designated as A and B, respectively, and evacuated from the device through the other two conduits 303, designated C and D, respectively. Since as above mentioned the interior configuration of the casing 301 and the relation of the conduits 303 to the casing 301 are the same as that in the third form of my device above described, the fluid under pressure causes the rotor 309 to drive the shaft 310.

As above pointed out regarding the third form of my device, the direction of rotation of the shaft 310 can be reversed by use of a valve system for reversing the direction of flow of the fluid.

When the fourth form of my device is used as a pump, power is applied to the shaft 310 to rotate the rotor 309 which causes the fluid to be introduced through two conduits 303 (A and B) and evacuated under pressure through two conduits 303 (C and D). If the direction of rotation of the shaft 310 be reversed, the direction of flow of the fluid will be reversed.

Having described my invention, what I claim is:

1. In a fluid flow device adapted to operate either as a motor or a pump, the combination of a casing; a shaft journaled in said casing; a cylindrical rotor mounted on said shaft and having a plurality of radial, slidable vanes; a shell received in said casing; and a second shell rotatably, adjustably mounted in said first shell, said rotor being disposed in said second shell, and the inner surface of said second shell being so configured in cross-section as to have a pair of diametrical opposite concavities into and out of which said vanes slide, said casing having two pairs of ports, said first shell having two pairs of ports, and said second shell having two pairs of ports, said first shell having a conduit having one end extending through said casing and its other end having two ports connected with one pair of said ports of said first shell, said second shell being adapted in one position to connect one pair of its ports with said conduit's ports and the other pair of its ports with the other pair of ports in said first shell and one of said pairs of ports in said casing, and in a second adjusted position to connect the other pair of its ports with said conduit's ports and the first mentioned pair of its ports with the other pair of ports of said first shell and the other pair of ports of said casing, so that positioning said second shell in either one of two positions the rotor rotates in either one of two directions when the device functions as a motor, and the fluid flows in either one of two directions when the device functions as a pump.

2. A device, according to claim 1, in which said concavities have that degree of maximum depth to permit said vanes to slide into and out of said concavities at a determined speed of rotation of said rotor.

References Cited in the file of this patent

UNITED STATES PATENTS

| | | | |
|---|---|---|---|
| 861,626 | Young | July 30, | 1907 |
| 911,852 | Tutt | Feb. 9, | 1909 |
| 1,087,181 | Pitman | Feb. 17, | 1914 |
| 1,332,516 | O'Donnell | Mar. 2, | 1920 |
| 1,658,524 | Gurley | Feb. 7, | 1928 |
| 1,913,758 | Hapkins | June 13, | 1933 |
| 1,989,900 | Vickers | Feb. 5, | 1935 |
| 2,250,947 | Carpenter | July 29, | 1941 |
| 2,387,761 | Kendrick | Oct. 30, | 1945 |
| 2,414,187 | Borsting | Jan. 14, | 1947 |
| 2,433,484 | Roth | Dec. 30, | 1947 |
| 2,525,619 | Roth et al. | Oct. 10, | 1950 |
| 2,569,717 | Holl | Oct. 2, | 1951 |
| 2,570,411 | Vickers | Oct. 9, | 1951 |
| 2,612,110 | Delegard | Sept. 30, | 1952 |
| 2,660,123 | Vlachos | Nov. 24, | 1953 |
| 2,725,013 | Vlachos | Nov. 29, | 1955 |
| 2,790,391 | Holl | Apr. 30, | 1957 |
| 2,861,517 | Neff | Nov. 25, | 1958 |